United States Patent [19]

Jadatz

[11] Patent Number: 4,930,960
[45] Date of Patent: Jun. 5, 1990

[54] MOUNTING ARRANGEMENT FOR ELECTRICAL WIRING DEVICES HAVING NON-METALLIC MOUNTING STRAP

[75] Inventor: Harald B. Jadatz, Deer Park, N.Y.

[73] Assignee: Slater Electric Inc., Glen Cove, N.Y.

[21] Appl. No.: 194,057

[22] Filed: May 13, 1988

[51] Int. Cl.$^5$ .................... F16B 39/282; H02G 3/08
[52] U.S. Cl. ................. 411/188; 411/908; 411/959; 439/535; 439/650
[58] Field of Search .................. 411/185–189, 411/399, 403, 410, 404, 160–162, 957, 959; 220/3, 2; 439/535, 650, 651

[56] References Cited

U.S. PATENT DOCUMENTS

| | | | |
|---|---|---|---|
| 2,800,829 | 7/1957 | West | 411/404 |
| 3,269,250 | 8/1966 | Curtiss | 411/410 |
| 3,526,703 | 9/1970 | Tucker | 220/3.2 |
| 3,825,051 | 7/1974 | Sigmund | 411/188 |
| 4,223,711 | 9/1980 | Tabor | 411/188 |
| 4,518,294 | 5/1985 | Barth | 411/399 |
| 4,764,066 | 8/1988 | Terrell et al. | |

OTHER PUBLICATIONS

AKKO Catalog Sheet for Flanged Head Fasteners:
Eskay Catalog Sheet for ES-Grip Low Torque, Heavy Duty Tapping Screw for Light Gauge Metals and ES Drill Sheet Metal Screws, ES-Dril #1 and ES Dril #2.
Maclean-Fog Catalog Sheet for Flanged Head Fasteners. Excerpt (p. 78), from *Machine Design*, 11/19/87.
Excerpt (p. 57), from *Fastening, Joining and Assembly Components Reference Issue*.

*Primary Examiner*—Neill R. Wilson
*Attorney, Agent, or Firm*—Morgan & Finnegan

[57] ABSTRACT

A mounting screw for mounting an electrical wiring device having non-metallic components, to an electrical outlet box and combination of root electrical wiring device and screw. The screw includes a head and a shank, with a lip projecting downwardly from the bottom surface of the screw head spaced from and encircling the shank, and a series of ribs extending radially outward between the shank and the lip. Advantageously the mounting screw is in combination with an electrical wiring device having non-metallic mounting straps so that when the screw is installed by a power tool, the lip-and-ribs arrangement on the screw bites into the mounting strap material to produce resistance to the turning of the power tool signaling the operator that the screw is secure.

10 Claims, 2 Drawing Sheets

MOUNTING ARRANGEMENT FOR ELECTRICAL WIRING DEVICES HAVING NON-METALLIC MOUNTING STRAP

FIELD OF THE INVENTION

The present invention relates generally to an improvement in electrical wiring devices, and more particularly, to electrical wiring devices with non-metallic mounting straps and to mounting screws for installing the electrical wiring device in an electrical outlet box.

BACKGROUND OF THE INVENTION

Recently, the electrical wiring device industry has begun to substitute lightweight inexpensive materials such as molded plastic for metal parts, including the mounting straps in such devices. Traditionally, electrical wiring devices have been mounted to an electrical outlet box by means of a flat head screw which is beveled along the bottom of the screw head. The device mounting screws which extend through apertures in the mounting strap are often driven by a power tool (as well as by hand) into an appropriate opening in the electrical outlet box.

This conventional mounting screw arrangement has worked satisfactorily with devices having metal mounting straps. However, when non-metallic materials have been substituted for metal straps, in the form of plastic integral mounting straps, a problem has developed when the conventional mounting screws are installed. The power tool operator (or installer) does not know exactly when the screw is fully turned down and therefore when to stop. This often results in the screw cutting into the plastic of the integral mounting strap and greatly weakening the area of securement. Sometimes the screw can even "chew" through the material surrounding the mounting aperture on the strap, thus rendering ineffective the mounting at that end. (For metal screws used with metal straps, this is not a significant concern because the metal strap can easily withstand the frictional forces generated by the turning screw).

Accordingly, there is a need for a new and improved mounting screw which avoids the foregoing disadvantages. It is therefore an object of the present invention to provide a new and improved mounting screw for use with non-metallic mounting straps.

It is also an object of the invention to provide such a screw which will resist damaging the non-metallic mounting strap.

It is a further object of the invention to provide such a screw which resists further turning when its screw head has been fully turned, thus signaling the power tool operator (or installer) to stop turning so as to prevent the screw from cutting through the aperture in the non-metallic integral mounting strap.

It is a further object of this invention to provide a new and improved mounting screw which is compatible with all non-metallic materials.

It is an additional object of the invention to provide a combination electrical wiring device with non-metallic mounting straps and mounting screw wherein there is little or no danger of weakening the area of securement on the mounting strap if the screw is overturned. Such a combination overcomes the present problems because the mounting screw resists further turning when its screw head has been fully turned signaling the power tool operator (or installer) to stop turning.

SUMMARY OF THE INVENTION

The invention relates to a new and improved mounting screw for use with an electrical wiring device and to a combination of such screws with an electrical wiring device having a non-metallic mounting strap. The electrical wiring device includes a body and cover which form a device housing that defines the device function (i.e., a switch or receptacle) with a non-metallic mounting strap extending from each end of the housing. Each end of the mounting strap includes an aperture for receiving a device mounting screw. Advantageously and according to the invention, the mounting screws include a head and a threaded shank, with a series of projections formed on the underside of the head to wedge slightly into the material of the strap when fully turned against the strap. As preferably embodied, the projections comprise a lip which extends downwardly from the underside of the head along the perimeter of the head, and a series of ribs protruding downwardly from the underside of the head generally radially outwardly from the shank.

In one embodiment, the ribs are essentially straight and extend radially outwardly between the screw shank and the downwardly projecting lip. In another embodiment, the ribs are somewhat arcuate to form a helical-like configuration on the underside of the screw head.

The topside of the head has a curvature and preferably includes a cross-recessed slatted screw head configuration for engaging a Phillips head-type tool tip.

It will be understood by those skilled in the art that the objects herein are achieved by the invention. Thus, when the screw is turned to the point where it abuts the non-metallic strap, the lip and the protruding ribs bite into the mounting strap to resist further turning of the power tool. This signals the power tool operator to stop and thus prevents the screw from cutting through the integral mounting strap. It will also be understood that the cross-recessed slatted screw head configuration on the topside of the head also helps to prevent overturning in that the modified structure permits the power tool to grab only in the middle of the slot. That is the power tool tip will lose its engagement (i.e., cam out) when the lip and ribs bite into the strap causing resistance to the turning of the power tool.

DESCRIPTION OF THE PREFERRED EMBODIMENT

Figure 1:
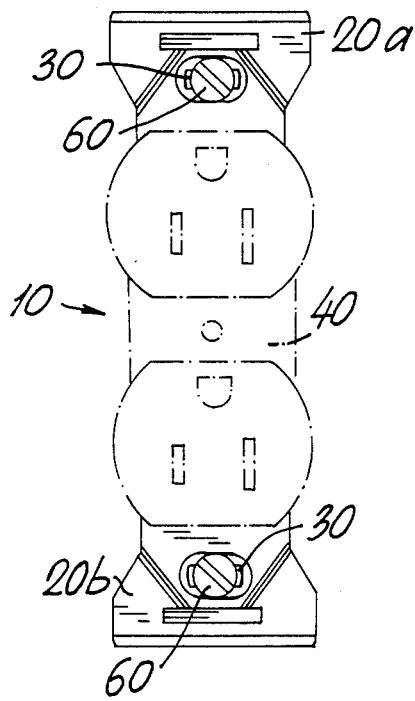
FIG. 1 is a front elevation view of a preferred embodiment of receptacle and mounting screws according to the present invention.

FIG. 1 illustrates a preferred embodiment of the electrical wiring device and mounting screw according to the invention. As here embodied, the electrical wiring device such as an electrical outlet receptacle device 10 includes a body and cover (not separately shown) which together form a device housing (indicated generally at 40) having a non-metallic mounting strap, with strap portions 20a and 20b extending from opposite ends of housing 40.

It will be understood by those skilled in the art that device housing 40 can be formed to provide either a switch function or receptacle function. An exemplary device with integral mounting straps is disclosed in copending application Ser. No. 010,373, filed Feb. 3, 1987 which is assigned to the same assignee as this application and which is hereby incorporated by reference herein.

Each integral mounting strap portion 20a and 20b includes an aperture (each indicated at 30) and, as here embodied, is formed integrally with the device housing. A mounting screw according to the invention (each indicated at 60) is received in each aperture 30.

Figure 2:
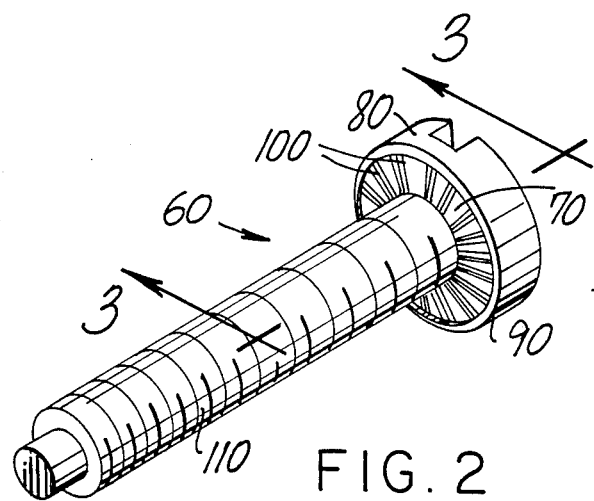
FIG. 2 is a perspective view of one embodiment of mounting screw according to the invention.
Figure 3:
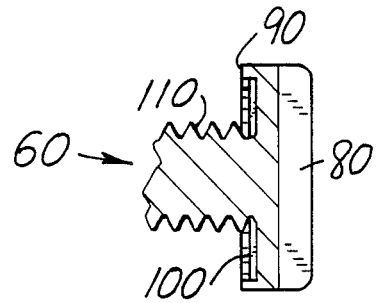
FIG. 3 is a cross-sectional view of the mounting screw shown in FIG. 2, taken along section lines 3—3.

Referring now to FIGS. 2 and 3, there is shown one embodiment of mounting screw 60, which may be used to mount the electrical wiring device to an electrical outlet box, having non-metallic mounting straps.

The mounting screw 60, which is preferably made from steel but may be fabricated from brass or other metal, includes a head 80 having an underside 70 and a threaded shank 110. According to the invention, a lip 90 and a series of ribs 100 extend from underside 70. The lip 90 extends downwardly from the underside 70 of head 80 a distance of about 0.010 inches to about 0.015 inches and preferably continues along the entire perimeter of the head 80. The ribs 100 protrude downwardly from the underside of the head 70 a distance of about 0.003 inches to about 0.008 inches and extend radially outwardly from shank 110.

According to the embodiment of FIGS. 2-3, the ribs 100 are essentially straight and extend radially between shank 110 and lip 90.

In operation, the mounting screws 60, are inserted through apertures 30 in the mounting strap portions 20a and 20b and thence into appropriate openings in an electrical outlet box (not shown). As each screw is fully threaded into the outlet box opening, the lip bites into the material of the strap. Shortly thereafter, the ribs also bite into the strap material. The material tends to be caught within the spacing defined by the lip and ribs causing resistance and signaling the power tool operator (or installer) to stop the turning operation.

Figure 7:
FIG. 7 is a cross-sectional view of a portion of the head of the mounting screw shown in FIG. 6, taken along section lines 7—7.
Figure 4:
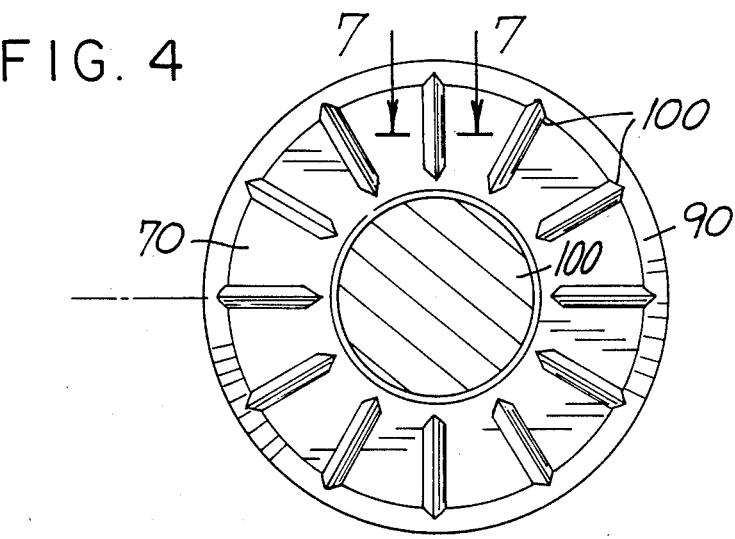
FIG. 4 is a bottom end view of the mounting screw shown in FIG. 2.
Figure 6:
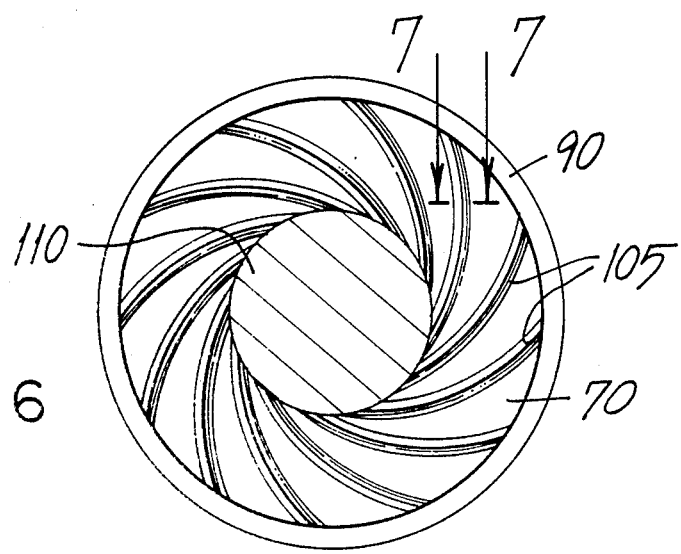
FIG. 6 is a bottom end view of an alternate embodiment of mounting screw according to the invention.

Turning now to FIGS. 6 and 7, there is shown an alternate embodiment of the screw according to the invention, wherein the ribs located on the underside of the head have a different configuration from those shown in FIGS. 2-4. As here embodied, ribs 105 are curved arcuate in shape and extend between the shank and lip 85 to form a helical-like configuration. It will be understood that the embodiment of the screw shown in FIGS. 6-7 operates substantially the same as that shown in FIGS. 2-4.

Figure 8:
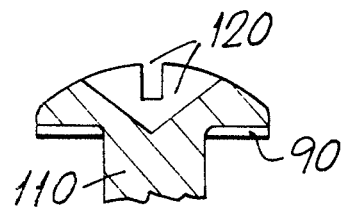
FIG. 8 is a cross-sectional view of the head of the mounting screw according to the invention, taken along section lines 8—8 of FIG. 5.
Figure 5:
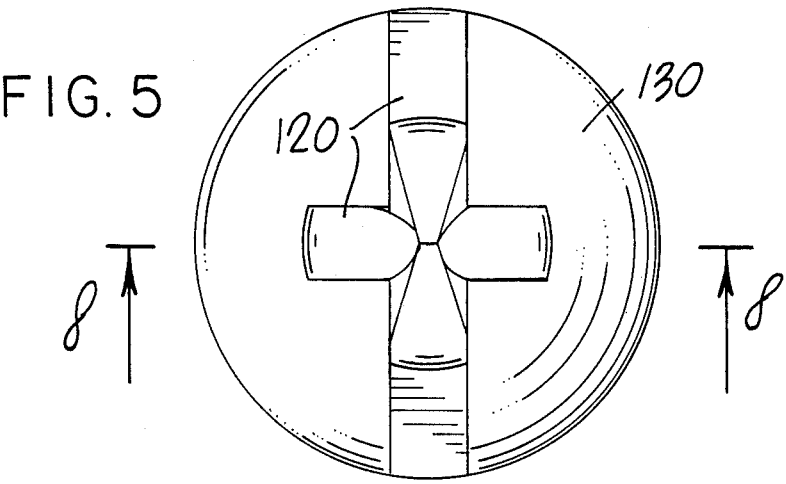
FIG. 5 is a top end view of the mounting screw shown in FIG. 2.

Referring now to FIGS. 5 and 8, there is shown a preferred configuration of the top end view of mounting screw according to the invention. As here embodied, the top of the mounting screw is curved and preferably includes a cross-recessed slatted screw head configuration 120. This configuration also helps to prevent overturning in that the modified structure permits the power tool to grab only in the middle of the slot. The power tool tip will lose its engagement when the lip and ribs bite into the strap causing resistance to the turning of the power tool.

It will be appreciated that the foregoing embodiment is exemplary of the invention and that variations or modifications can be made without departing from its scope as defined by the claims. Thus, for example, other arrangements of ribs may be incorporated so long as they are designed to cooperate with the lip to resist turning when the screw is turned home.

What is claimed is:

1. In an electrical wiring device comprising a device housing having non-metallic mounting straps with an aperture in each mounting strap for receiving a mounting screw to secure said device to an outlet box, wherein the improvement comprises a mounting screw at the aperture of each mounting strap for affixing said device to said outlet box, each said mounting screw comprising a head and a shank, said head having a topside and an underside wherein said underside of said head includes a lip and a series of ribs, said lip extending downward from the underside of said head and continuing along the perimeter of said head, said ribs protruding downwardly from the underside of said head between said screw shank and said lip, so that when said mounting screw is turned to the point where it abuts the non-metallic mounting strap, said lip and said ribs bite into said mounting strap to resist further turning.

2. The electrical wiring device of claim 1 wherein said ribs extend generally radially outwardly from said shank to said lip.

3. The electrical wiring device of claim 2 wherein said ribs are essentially straight and extend radially outwardly between said shank and lip.

4. The electrical wiring device of claim 2 wherein said ribs are curved in a helical-like configuration.

5. The electrical wiring device of claim 3 wherein said lip extends downwardly farther than said ribs.

6. The electrical wiring device of claim 4 wherein said lip extends downwardly farther than said ribs.

7. The electrical wiring device of claim 2 wherein said lip extends downwardly a distance of about 0.010 inches to about 0.015 inches along the perimeter of said head.

8. The electrical wiring device of claim 2 wherein said ribs protrude from said underside of said head downwardly a distance of about 0.003 inches to about 0.008 inches.

9. The electrical wiring device of claim 2 wherein said lip extends downwardly a distance of about 0.010 inches to about 0.015 inches along the perimeter of said head and said ribs protrude from said underside of said head downwardly a distance of about 0.003 inches to about 0.008 inches.

10. The electrical wiring device of claim 1 wherein the topside of said screw includes a curvature and a cross-recessed slatted screw head configuration for receiving a Phillips head-type tool tip.

* * * * *